United States Patent [19]
Mochizuki et al.

[11] Patent Number: 6,014,443
[45] Date of Patent: Jan. 11, 2000

[54] SEMICONDUCTOR MEMORY DEVICE HAVING COPY PROTECT FUNCTION AND METHOD FOR ACCESSING THE SAME

[75] Inventors: Yoshio Mochizuki, Kawasaki; Yuuichi Tatsumi, Tokyo, both of Japan

[73] Assignee: Kabushiki Kaisha Toshiba, Kawasaki, Japan

[21] Appl. No.: 08/859,682

[22] Filed: May 20, 1997

[30] Foreign Application Priority Data

May 21, 1996 [JP] Japan .................................... 8-125746

[51] Int. Cl.⁷ ........................................................ H04L 9/00
[52] U.S. Cl. .................................................................... 380/4
[58] Field of Search ................................ 380/4; 711/106

[56] References Cited

U.S. PATENT DOCUMENTS 5,563,945   10/1996   Gerceki ........................................ 380/4
5,890,199   3/1999   Downs ........................................ 711/106

FOREIGN PATENT DOCUMENTS 60-177498   9/1985   Japan .

*Primary Examiner*—Salvatore Cangialosi
*Attorney, Agent, or Firm*—Loeb & Loeb, LLP

[57] ABSTRACT

Cryptographic key data and data subjected to an operation by use of the cryptographic key data are previously stored in a memory cell array. A memory cell in which the cryptographic key data is stored is accessed and latched and the cryptographic key data is latched in a latch circuit before read out data from the memory cell array. After this, the latched data and data output from a sense amplifier are subjected to an operation by an arithmetical circuit to decode the data and the result of the operation is output as readout data.

32 Claims, 15 Drawing Sheets

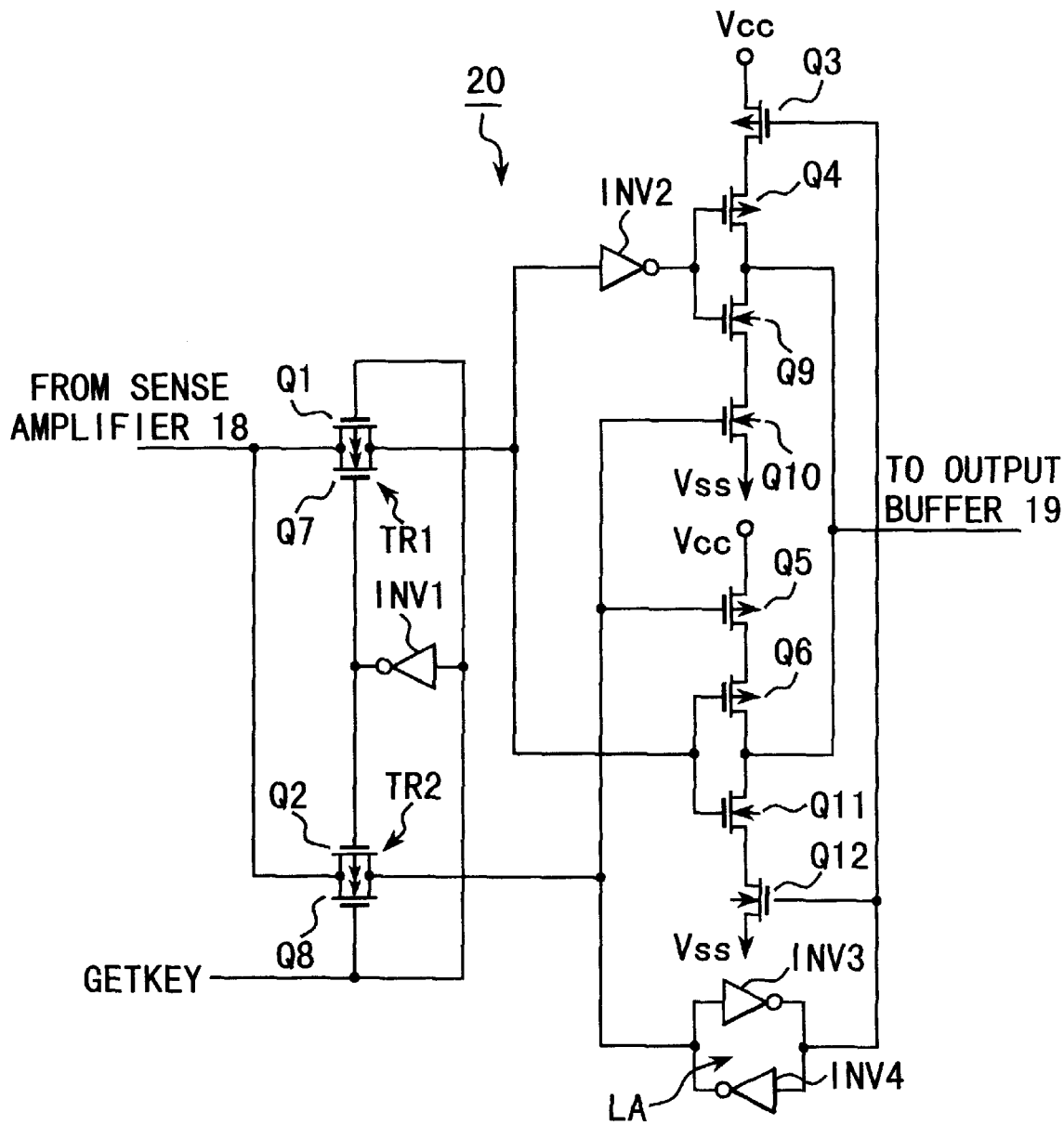
F I G. 4

|  | | CRYPTOGRAPHIC KEY DATA | PROGRAMMED DATA | OUTPUT DATA | PROGRAMMED DATA | OUTPUT DATA | PROGRAMMED DATA | OUTPUT DATA |
|---|---|---|---|---|---|---|---|---|
| WHEN CORRECT CRYPTOGRAPHIC KEY DATA IS LATCHED | HEX | A8 | 7E | 29 | FE | A9 | 28 | 5F |
| | BIN | 11<br>00<br>10<br>00 | 01<br>11<br>11<br>10 | 01<br>00<br>10<br>01 | 11<br>11<br>11<br>10 | 11<br>00<br>10<br>01 | 01<br>00<br>10<br>00 | 01<br>11<br>01<br>11 |
| WHEN ERRONEOUS CRYPTOGRAPHIC KEY DATA IS LATCHED | HEX | 82 | 7E | 03 | FE | 83 | 28 | 55 |
| | BIN | 10<br>00<br>01<br>00 | 01<br>11<br>11<br>10 | 00<br>00<br>01<br>01 | 11<br>11<br>11<br>10 | 10<br>00<br>01<br>01 | 01<br>00<br>10<br>00 | 00<br>11<br>00<br>11 |

F I G. 5 A

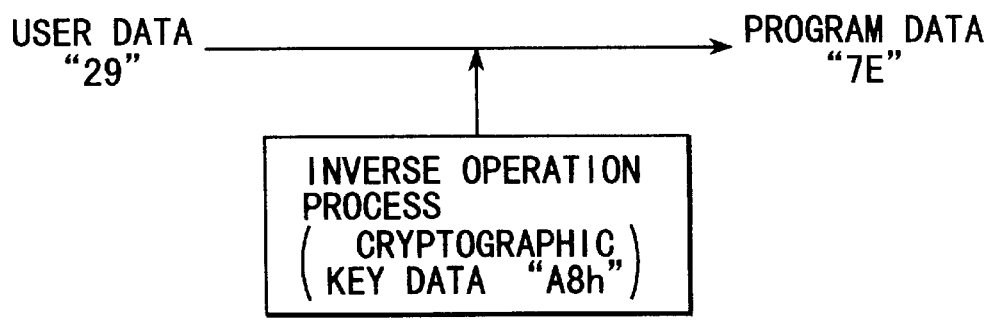

F I G. 5 B

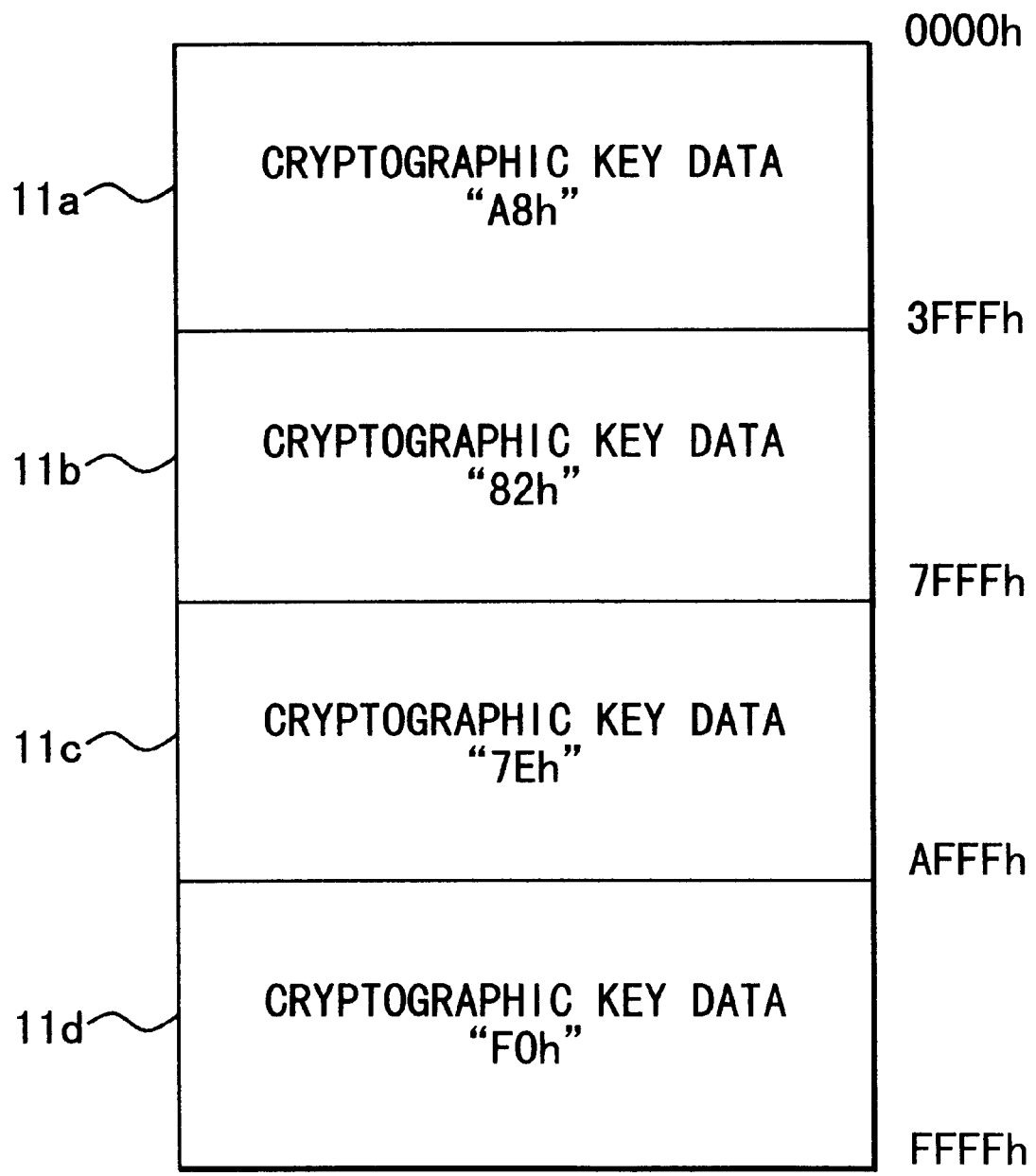
F I G. 6

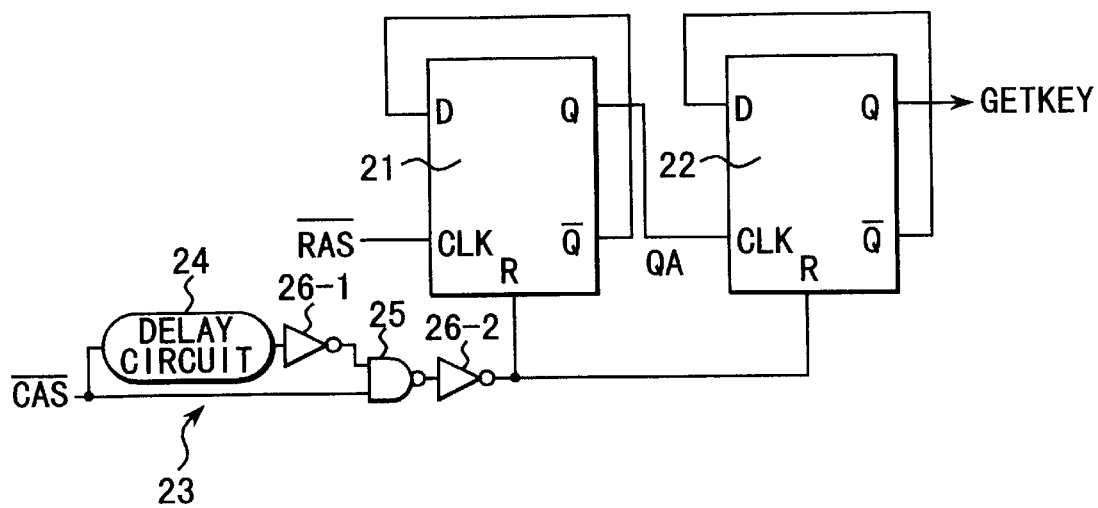
F I G. 8
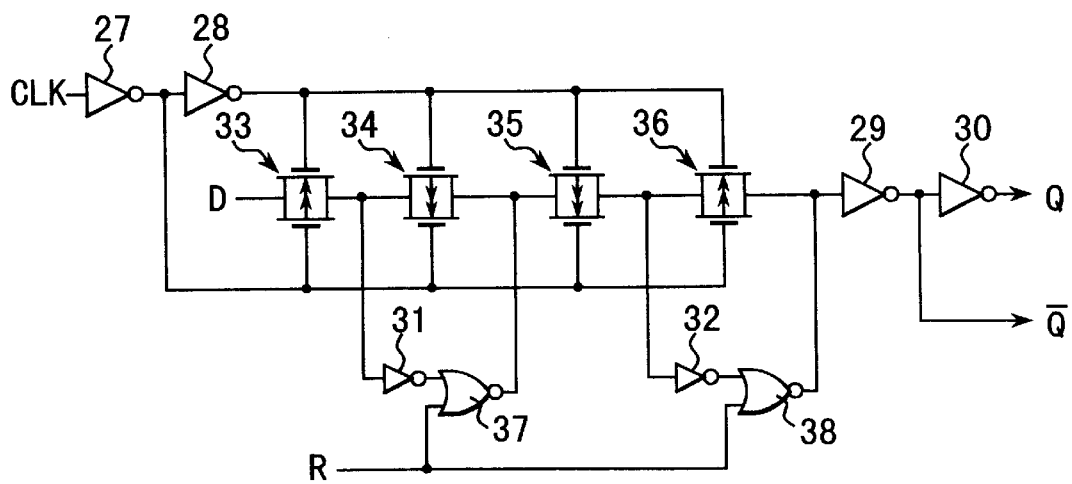
F I G. 9

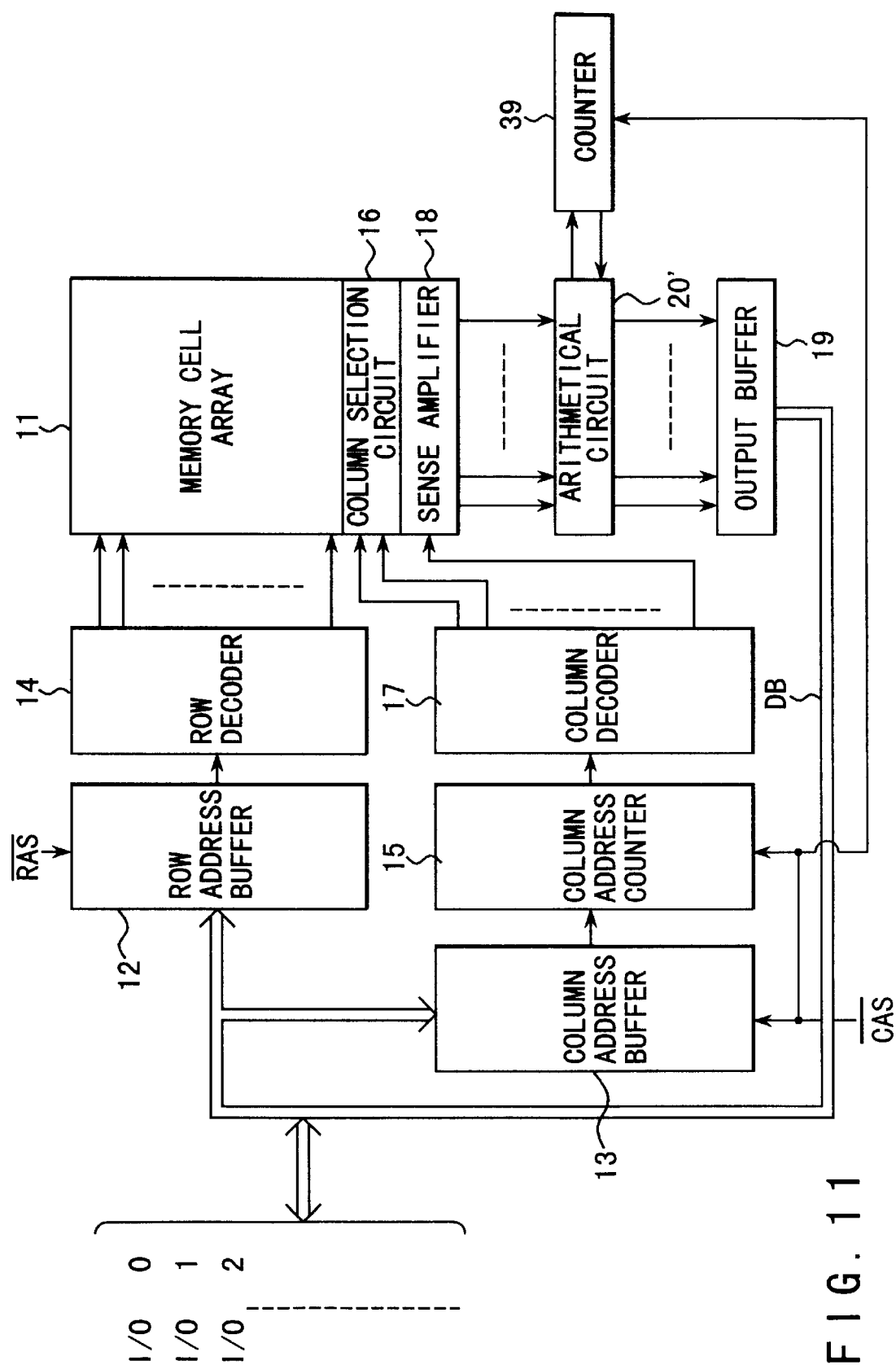
F I G. 11

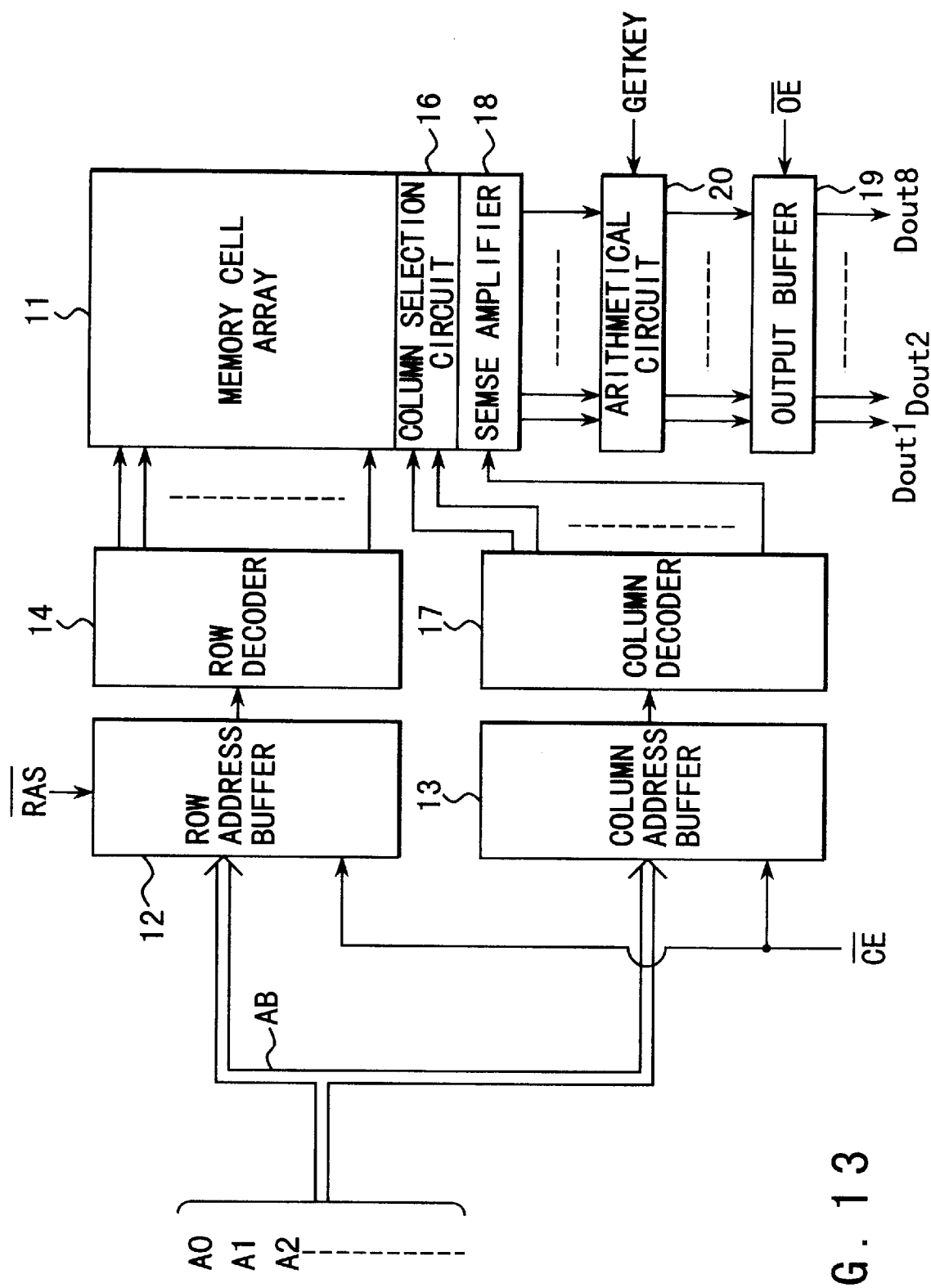
F I G. 13

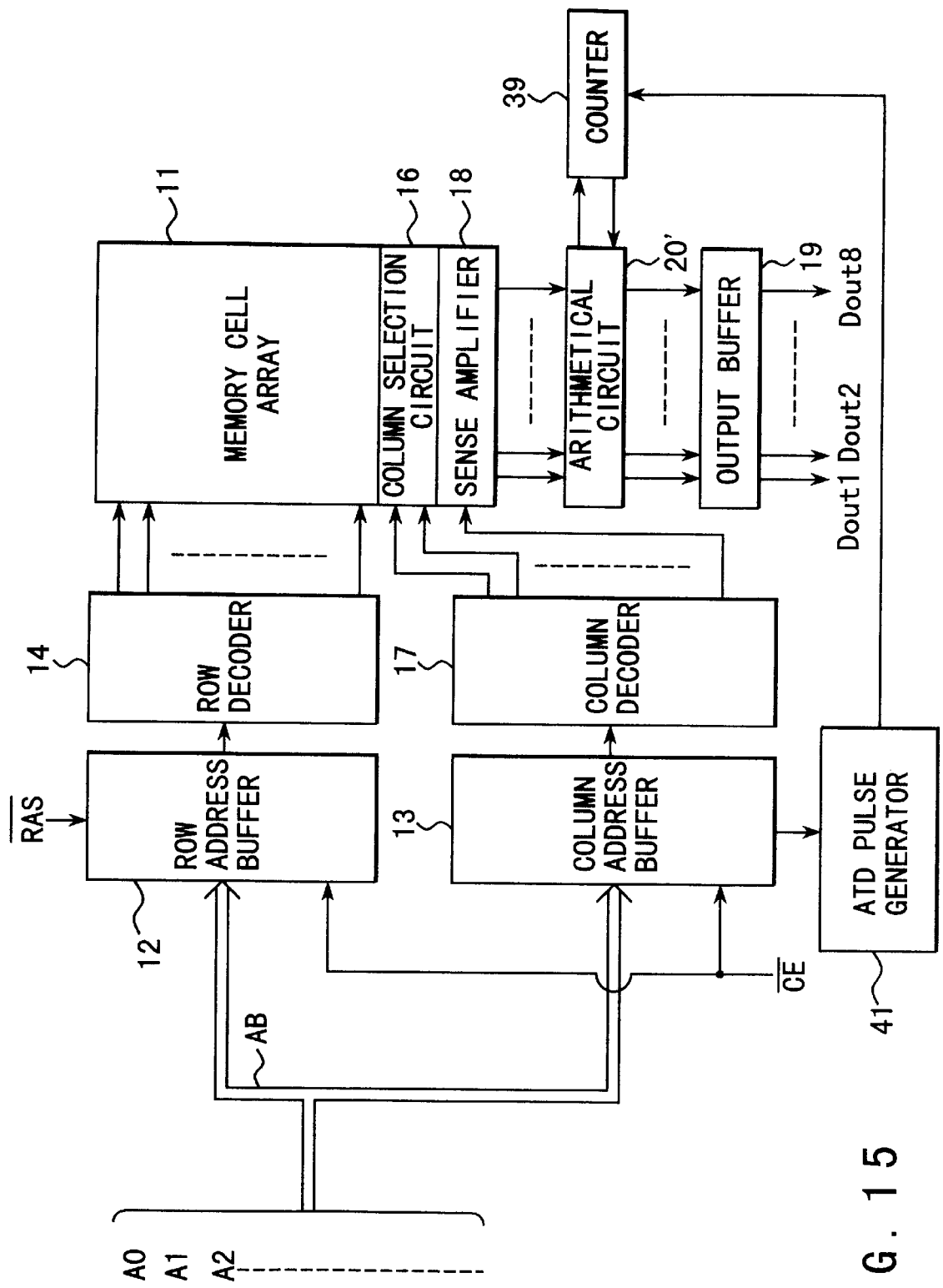
F I G. 15

SEMICONDUCTOR MEMORY DEVICE HAVING COPY PROTECT FUNCTION AND METHOD FOR ACCESSING THE SAME

BACKGROUND OF THE INVENTION

This invention relates to a semiconductor memory device having a protect function against illegal copy and a method for accessing the same.

The memory cell array of a semiconductor memory device, for example, a mask ROM (Read Only Memory) is constructed by arranging memory cells which are formed of MOS transistors in a matrix form of rows and columns, connecting the gates of the memory cells on each row to a corresponding one of a plurality of word lines, connecting the drains of the memory cells on each column to a corresponding one of a plurality of bit lines, and connecting the sources thereof to the ground node. As a method for writing data into each memory cell, (a) a diffused layer programming method, (b) an ion-implantation programming method, and (c) a contact programming method are known, and data is written by using a photomask in the course of the manufacturing process by defining "0", "1" of memory information according to whether a MOS transistor is formed or not, whether the MOS transistor is of depletion type or enhancement type, or whether a contact hole is formed or not, for example. Memory data is read out by selecting and charging a bit line, selecting a word line and setting the potential thereof to a high level and determining "0", "1" of memory information according to whether or not the bit line is discharged via a MOS transistor (memory cell) which is connected to the selected bit line and word line.

FIG. 1 is a block diagram showing the schematic construction of the conventional mask ROM described above. In a memory cell array 11, memory cells constructed by MOS transistors are arranged in a matrix form. A row address buffer 12 is supplied with a row address signal and latches the same in response to a /RAS ("/" attached before the symbol indicates an inverted signal, that is, a bar) signal. A column address buffer 13 is supplied with a column address signal and latches the same in response to a /CAS signal. A row decoder 14 selectively drives one of the word lines in the memory cell array 11 by decoding a row address signal output from the row address buffer 12 so as to select one row of the memory cells. A column address counter 15 is controlled by the /CAS signal and a latch output of the column address buffer 13 is set therein. The column address counter 15 sequentially counts up set data to create a column address signal. A column selection gate 16 selectively activates one of the bit lines in the memory cell array 11. A column decoder 17 decodes a column address signal output from the column address counter 15 to control the column selection gate 16 and select one column of the memory cells. A sense amplifier 18 amplifies data read out from a selected one of the memory cells in the memory cell array 11. An output buffer 19 is controlled by an /OE signal and outputs a signal amplified by the sense amplifier 18 via a data bus DB.

With the above construction, if a row address signal is input to the row address buffer 12 and a column address signal for specifying a column from which the reading operation is started is input to the column address buffer 13, a row address signal is supplied from the row address buffer 12 to the row decoder 14 in response to a /RAS signal and a readout starting column address signal is supplied from the column address buffer 13 to the column address counter 15 in response to a /CAS signal. As a result, one of the word lines is selected and driven by the row decoder 14, and at the same time, the readout starting column address signal is decoded by the column decoder 17 to control the column selection gate 16 and one of the bit lines is selected and charged. Data read out from a memory cell connected to the selected word line and bit line is supplied to the sense amplifier 18 via the column selection gate 16 and amplified and output to the data bus DB from the output buffer 19 in response to an /OE signal.

The column address counter 15 sequentially increments the content thereof one at a time in response to the /CAS signal to create a column address signal and supplies the same to the column decoder 17. As a result, memory data items are sequentially read out from the memory cells connected to the selected word line in the memory cell array 11.

After this, the word lines are sequentially selected, and the same readout operation is effected to read out data stored in the memory cell array 11.

However, with the above construction, there occurs a problem that data stored in the memory cell array 11 can be easily read out by sequentially incrementing the address of the ROM by use of a ROM writer or personal computer and the memory data can be easily copied by writing the readout data into a storage medium such as a hard disk or floppy disk.

BRIEF SUMMARY OF THE INVENTION

Accordingly, a first object of this invention is to provide a semiconductor memory device capable of substantially protecting memory data from illegal copy by making copied data unusable even if the memory data is copied by illegal means.

Further, a second object of this invention is to provide a method for accessing a semiconductor memory device capable of permitting a proper user to easily copy correct data and substantially protecting memory data from illegal copy by making copied data unusable even if the memory data is copied by illegal means.

The first object of this invention can be attained by a semiconductor memory device comprising a memory cell array having memory cells arranged in a matrix form of rows and columns; a row selection circuit for selecting a row of the memory cells in the memory cell array; a column specifying circuit for specifying a column of the memory cells in the memory cell array; a sense amplifier for determining memory data of one of the memory cells selected by the row selection circuit and the column specifying circuit; a holding circuit for holding data output from the sense amplifier; and an arithmetical circuit for subjecting data held in the holding circuit and data output from the sense amplifier to an operation; wherein data read out from the memory cell selected by the row selection circuit and the column specifying circuit is held in the holding circuit as cryptographic key data, then data held in the holding circuit and data output from the sense amplifier are subjected to the operation in the arithmetical circuit and the result of the operation is output as readout data.

With the above construction, unless an address of data treated as cryptographic key (encryption key) data is first accessed and the readout operation is effected with the data held in the holding circuit, the result of an operation performed based on erroneous data is output from the arithmetical circuit and correct data cannot be read out. Therefore, even if stored data is copied by illegal means, the data cannot be utilized and memory data can be substantially protected from illegal copy.

The first object of this invention can be attained by a semiconductor memory device comprising a memory cell array which has memory cells arranged in a matrix form of rows and columns and in which cryptographic key data and data subjected to an operation by use of the cryptographic key data are stored; word lines each connected to the gates of the memory cells arranged on a corresponding one of the rows in the memory cell array; bit lines each connected to the drains of the memory cells arranged on a corresponding one of the columns in the memory cell array; a word line selecting circuit for selecting the word line; a bit line selecting circuit for selecting the bit line; a sense amplifier for amplifying data read out from the memory cell selected by the word line selecting circuit and the bit line selecting circuit; a latch circuit for latching data output from the sense amplifier in response to a control signal; an arithmetical circuit for subjecting data latched in the latch circuit and data output from the sense amplifier to an operation in response to the control signal; and an output circuit for outputting the result of the operation performed by the arithmetical circuit; wherein an address of the memory cell of the memory cell array in which the cryptographic key data is stored is selected by the word line selecting circuit and the bit line selecting circuit, cryptographic key data output from the sense amplifier is latched in the latch circuit, then an address of one of the memory cells in the memory cell array is selected by the word line selecting circuit and the bit line selecting circuit, data output from the sense amplifier and cryptographic key data latched in the latch circuit are subjected to the operation by the arithmetical circuit, and the result of the operation is output as readout data from the output circuit.

With the above construction, unless an address of data treated as cryptographic key (encryption key) data is first accessed and the readout operation is effected with the data held in the holding circuit, the result of an operation performed based on erroneous data is output and correct data cannot be read out. Further, since data derived by use of the cryptographic key data is stored in the memory cell array, memory data in the memory cell array is encoded data (ciphertext) which is not yet subjected to the operation process for decoding and cannot be utilized if it is simply copied. Therefore, even if stored data is copied by illegal means, the data cannot be utilized and memory data can be substantially protected from illegal copy.

Further, the first object of this invention can be attained by a semiconductor memory device comprising a memory cell array which has memory cells arranged in a matrix form of rows and columns and in which cryptographic key data and data subjected to an operation by use of data obtained by sequentially incrementing or decrementing the cryptographic key data are stored; word lines each connected to the gates of the memory cells arranged on a corresponding one of the rows in the memory cell array; bit lines each connected to the drains of the memory cells arranged on a corresponding one of the columns in the memory cell array; a word line selecting circuit for selecting the word line; a bit line selecting circuit for selecting the bit line; a sense amplifier for amplifying data read out from the memory cell selected by the word line selecting circuit and the bit line selecting circuit; a counter in which data output from the sense amplifier is set in response to a control signal and which is sequentially incremented or decremented in response to the control signal; an arithmetical circuit for subjecting a count value of the counter and data output from the sense amplifier to an operation in response to the control signal; and an output circuit for outputting the result of the operation by the arithmetical circuit; wherein an address of the memory cell of the memory cell array in which the cryptographic key data is stored is selected by the word line selecting circuit and the bit line selecting circuit, cryptographic key data output from the sense amplifier is set in the counter, then an address of one of the memory cells in the memory cell array is selected by the word line selecting circuit and the bit line selecting circuit, data output from the sense amplifier and the count value of the counter are subjected to the operation by the arithmetical circuit, and the result of the operation is output as readout data from the output circuit.

With the above construction, unless an address of data treated as cryptographic key (encryption key) data is first accessed and the readout operation is effected with the data set in the counter, the result of an operation performed based on erroneous data is output and correct data cannot be read out. Further, since the count value of the counter is sequentially incremented or decremented in response to the control signal, it is difficult to specify the cryptographic key data. Further, since data subjected to the operation by use of data derived by sequentially incrementing or decrementing the cryptographic key data is stored in the memory cell array, memory data in the memory cell array is encoded data (ciphertext) which is not yet subjected to the operation process for decoding and cannot be utilized if it is simply copied. Therefore, even if stored data is copied by illegal means, the data cannot be utilized and memory data can be substantially protected from illegal copy.

The first object of this invention can be attained by a semiconductor memory device comprising a memory cell array which has memory cells arranged in a matrix form of rows and columns and in which cryptographic key data and data subjected to an operation by use of the cryptographic key data and data to be stored are stored; word lines each connected to the gates of the memory cells arranged on a corresponding one of the rows in the memory cell array; bit lines each connected to the drains of the memory cells arranged on a corresponding one of the columns in the memory cell array; a word line selecting circuit for selecting the word line; a bit line selecting circuit for selecting the bit line; a sense amplifier for amplifying data read out from the memory cell selected by the word line selecting circuit and the bit line selecting circuit; an arithmetical circuit supplied with an output signal from the sense amplifier; an output circuit for outputting the result of the operation performed by the arithmetical circuit; and a register for temporarily storing output data of the output circuit and supplying the same to the arithmetical circuit; wherein an address of the memory cell of the memory cell array in which the cryptographic key data is stored is selected by the word line selecting circuit and the bit line selecting circuit, cryptographic key data output from the sense amplifier is temporarily stored in the register, then an address of one of the memory cells in the memory cell array is selected by the word line selecting circuit and the bit line selecting circuit, data output from the sense amplifier and data temporarily stored in the register are subjected to an operation by the arithmetical circuit, and the result of the operation is output as readout data from the output circuit and temporarily stored in the register.

With the above construction, unless an address of data treated as cryptographic key (encryption key) data is first accessed and the readout operation is effected with the data temporarily stored in the register, the result of an operation performed based on erroneous data is output and correct data cannot be read out. Further, since the register is updated by the output data each time data is read out, it is more difficult to specify the cryptographic key data. Further, since data subjected to an operation by use of cryptographic key data and data to be stored is stored in the memory cell array, memory data in the memory cell array is encoded data (ciphertext) which is not yet subjected to the operation process for decoding and cannot be utilized if it is simply copied. Therefore, even if stored data is copied by illegal means, the data cannot be utilized and memory data can be substantially protected from illegal copy.

The first object of this invention can be attained by a semiconductor memory device comprising a memory cell array which has memory cells arranged in a matrix form of rows and columns and in which cryptographic key data and data subjected to an operation by use of data derived by sequentially incrementing or decrementing the cryptographic key data are stored; word lines each connected to the gates of the memory cells arranged on a corresponding one of the rows in the memory cell array; bit lines each connected to the drains of the memory cells arranged on a corresponding one of the columns in the memory cell array; a word line selecting circuit for selecting the word line; a bit line selecting circuit for selecting the bit line; a sense amplifier for amplifying data read out from the memory cell selected by the word line selecting circuit and the bit line selecting circuit; an arithmetical circuit supplied with an output signal of the sense amplifier; an output circuit for outputting the result of the operation performed by the arithmetical circuit; an address transition detecting circuit for detecting the transition of the address; and a counter which is sequentially incremented or decremented each time the address transition is detected by the address transition detecting circuit and supplies the count to the arithmetical circuit; wherein an address of the memory cell of the memory cell array in which the cryptographic key data is stored is selected by the word line selecting circuit and the bit line selecting circuit, cryptographic key data output from the sense amplifier is set in the counter, then an address of one of the memory cells in the memory cell array is selected by the word line selecting circuit and the bit line selecting circuit, data output from the sense amplifier and the count value of the counter are subjected to the operation by the arithmetical circuit, and the result of the operation is output as readout data from the output circuit.

With the above construction, unless an address of data treated as cryptographic key (encryption key) data is first accessed and the readout operation is effected with the data set in the counter, the result of an operation performed based on erroneous data is output and correct data cannot be read out. Further, since the count value of the counter is sequentially incremented or decremented when the address transition is detected by the address transition detecting circuit, the analyzing process for specifying the cryptographic key data becomes difficult. Further, since a pin for inputting a control signal is unnecessary and the same number of pins and the same pin arrangement as in the normal case can be used, the analyzing process becomes difficult also in this respect. In addition, since data subjected to the operation by use of data derived by sequentially incrementing or decrementing the cryptographic key data is stored in the memory cell array, memory data in the memory cell array is encoded data (ciphertext) which is not yet subjected to the operation process for decoding and cannot be utilized if it is simply copied. Therefore, even if stored data is copied by illegal means, the data cannot be utilized and memory data can be substantially protected from illegal copy.

Further, the first object of this invention can be attained by a semiconductor memory device comprising a memory cell array which has memory cells arranged in a matrix form of rows and columns and in which cryptographic key data and data subjected to an operation by use of the cryptographic key data are stored; word lines each connected to the gates of the memory cells arranged on a corresponding one of the rows in the memory cell array; bit lines each connected to the drains of the memory cells arranged on a corresponding one of the columns in the memory cell array; a word line selecting circuit for selecting the word line; a bit line selecting circuit for selecting the bit line; a sense amplifier for amplifying data read out from the memory cell selected by the word line selecting circuit and the bit line selecting circuit; an arithmetical circuit supplied with an output signal from the sense amplifier; an output circuit for outputting the result of the operation performed by the arithmetical circuit; an address transition detecting circuit for detecting the transition of the address; and a register for temporarily storing output data of the output circuit when the address transition is detected by the address transition detecting circuit; wherein an address of the memory cell of the memory cell array in which the cryptographic key data is stored is selected by the word line selecting circuit and the bit line selecting circuit, cryptographic key data output from the sense amplifier is temporarily stored in the register, then an address of one of the memory cells in the memory cell array is selected by the word line selecting circuit and the bit line selecting circuit, data output from the sense amplifier and data temporarily stored in the register are subjected to an operation by the arithmetical circuit, and the result of the operation is output as readout data from the output circuit and supplied to and temporarily stored in the register.

With the above construction, unless an address of data treated as cryptographic key (encryption key) data is first accessed and the readout operation is effected with the data temporarily stored in the register, the result of an operation performed based on erroneous data is output and correct data cannot be read out. Further, since the value temporarily stored in the register is updated by the output data when the address transition is detected by the address transition detecting circuit, the analyzing process for specifying the cryptographic key data becomes difficult. Further, since a pin for inputting a control signal is unnecessary and the same number of pins and the same pin arrangement as in the normal case can be used, the analyzing process becomes difficult also in this respect. In addition, since data subjected to the operation by use of data sequentially derived based on cryptographic key data and temporarily stored in the register is stored in the memory cell array, memory data in the memory cell array is encoded data (ciphertext) which is not yet subjected to the operation process for decoding and cannot be utilized if it is simply copied. Therefore, even if stored data is copied by illegal means, the data cannot be utilized and memory data can be substantially protected from illegal copy.

The second object of this invention can be attained by a method for accessing a semiconductor memory device comprising a first step of storing cryptographic key data and data subjected to an operation by use of the cryptographic key data into a memory cell array; a second step of accessing an address of the memory cell array in which the cryptographic key data is stored; a third step of holding readout cryptographic key data; a fourth step of accessing the memory cell array to read out data; a fifth step of subjecting cryptographic key data held in the third step and data read out in the fourth step to an operation; and a sixth step of outputting the result of the operation obtained in the fifth step as readout data of the memory cell.

According to the above method, unless the memory cell in which the cryptographic key (encryption key) data is stored is accessed and then the readout operation is effected with the cryptographic key data kept held, the result of an operation performed based on erroneous data is output as readout data and correct data cannot be read out. Therefore, even if stored data is copied by illegal means, the data cannot be utilized and memory data can be substantially protected from illegal copy.

The second object of this invention can be attained by a method for accessing a semiconductor memory device comprising a first step of storing encoded data into a memory cell array; a second step of accessing an address of data stored in the memory cell array as cryptographic key data; a third step of holding readout data; a fourth step of accessing the memory cell array to read out data; a fifth step of subjecting data held in the third step and data read out in the fourth step to an operation; and a sixth step of outputting the result of the operation obtained in the fifth step as readout data from the memory cell.

According to the above method, unless data stored in the memory cell is accessed as the cryptographic key (encryption key) data and then the readout operation is effected with the data held, the result of an operation performed based on erroneous data is output as readout data and correct data cannot be read out. Further, a reduction in the memory capacity caused by storing the cryptographic key data can be prevented, and since a person who attempts to make an illegal copy cannot predict the presence of cryptographic key data from the arrangement of stored data items, it becomes more difficult to specify the cryptographic key data. Therefore, even if stored data is copied by illegal means, the data cannot be utilized and memory data can be substantially protected from illegal copy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a circuit diagram showing a circuit portion of one bit, for illustrating an example of the construction of an arithmetical circuit in a circuit shown in FIG. 2;

FIG. 5A is a diagram for illustrating one example of the operation by the arithmetical circuit shown in FIG. 4;

FIG. 5B is a conceptional diagram for illustrating a method for creating program data in the arithmetical circuit shown in FIG. 4;

FIG. 6 is a block diagram showing an address space of a memory cell array, for illustrating a semiconductor memory device according to a second embodiment of this invention;

FIG. 8 is a circuit diagram showing an example of the construction of a signal creating circuit for realizing the data readout operation shown in FIG. 7;

FIG. 9 is a circuit diagram showing an example of the construction of a flip-flop circuit in the circuit shown in FIG. 8;

FIG. 11 is a block diagram showing the schematic construction of a semiconductor memory device according to a fourth embodiment of this invention;

FIG. 13 is a block diagram showing the schematic construction obtained when this invention is applied to a random access ROM, for illustrating a semiconductor memory device according to a sixth embodiment of this invention;

FIG. 15 is a block diagram showing the schematic construction of a semiconductor memory device according to a seventh embodiment of this invention.

DETAILED DESCRIPTION OF THE INVENTION

Figure 1:
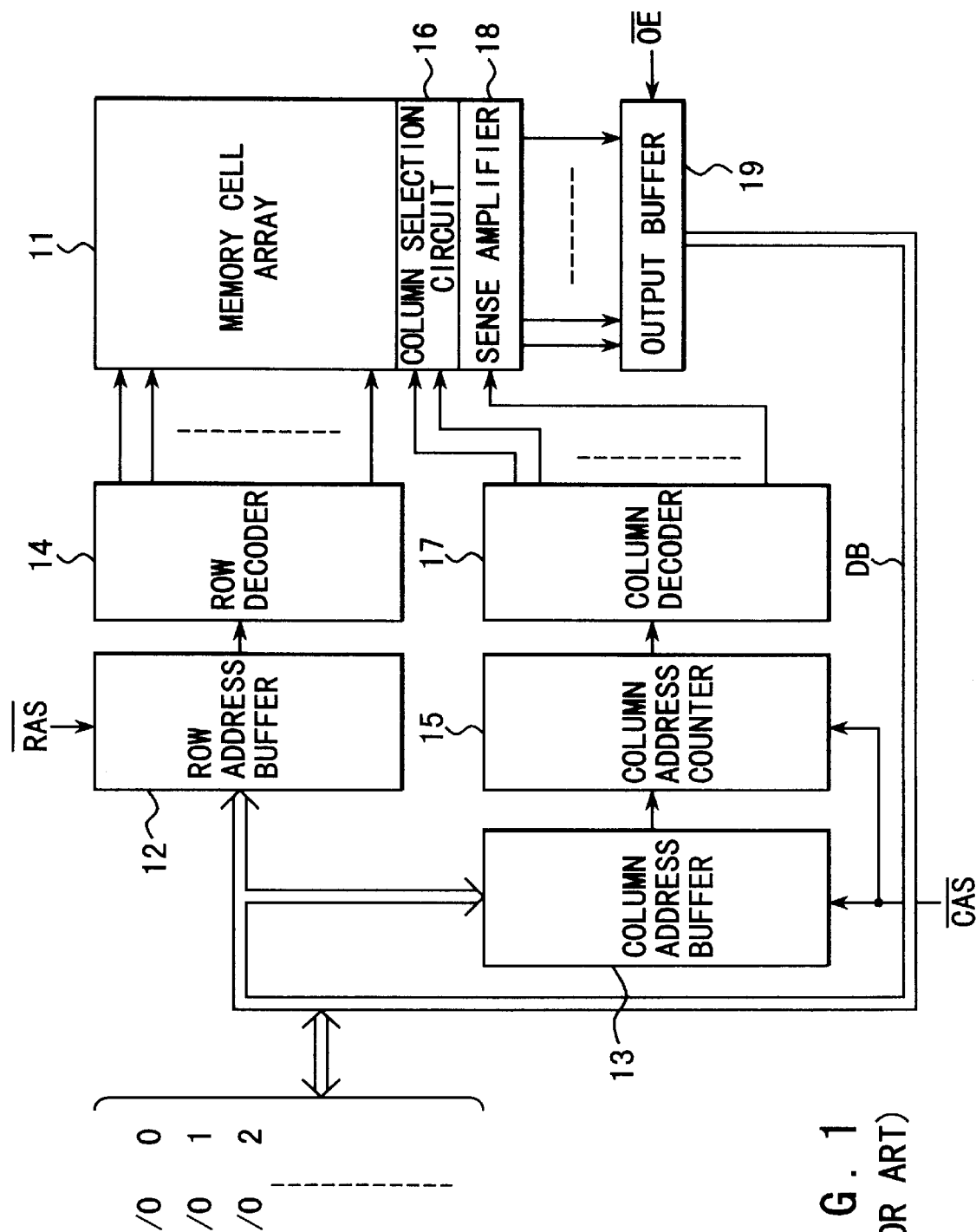
FIG. 1 is a block diagram showing the schematic construction of a mask ROM, for illustrating a conventional semiconductor memory device.
Figure 2:
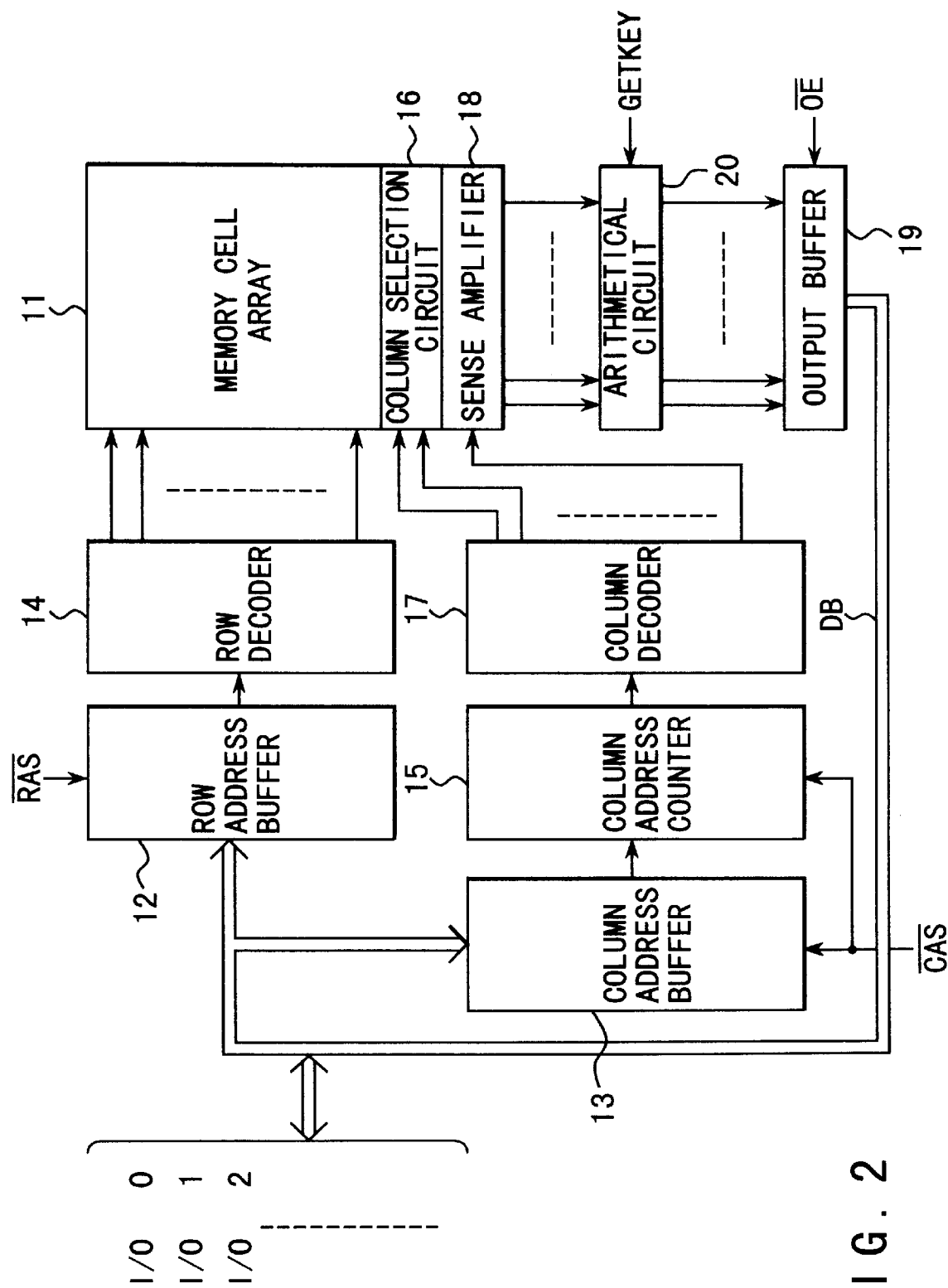
FIG. 2 is a block diagram showing the schematic construction of a semiconductor memory device according to a first embodiment of this invention.

FIG. 2 is a block diagram showing the schematic construction of a semiconductor memory device according to a first embodiment of this invention and shows a serial access ROM in which data is serially read out as an example. In a memory cell array 11, memory cells constructed by MOS transistors are arranged in a matrix form, the gates of the MOS transistors acting as the memory cells arranged on each row are connected to a corresponding one of word lines, the drains of the MOS transistors arranged on each column are connected to a corresponding one of bit lines, and the sources of the MOS transistors are grounded (or may be set in an electrically floating state). Cryptographic key (encryption key) data is stored in a desired address in the memory cell array 11. Further, previously encoded data (ciphertext) is written into the memory cell array 11 by use of a photomask so as to be decoded (encrypted) according to the cryptographic key or encryption key (which is 8-bit data in this example). For writing the above data items, any one of the diffused layer programming method, ion-implantation programming method, and contact programming method can be used. A row address buffer 12 is supplied with a row address signal and latches the same in response to a /RAS (row address strobe) signal. A column address buffer 13 is supplied with a column address signal and latches the same in response to a /CAS (column address strobe) signal. A row decoder 14 selectively drives one of the word lines in the memory cell array 11 by decoding a row address signal output from the row address buffer 12 so as to select one row of the memory cells. A column address counter 15 is controlled by the /CAS signal and a latch output of the column address buffer 13 is set therein. The column address counter 15 sequentially counts up set data to create a column address signal. A column selection gate 16 selects one of the bit lines in the memory cell array 11. A column decoder 17 decodes a column address signal output from the column address counter 15 to control the column selection gate 16 and select one column of the memory cells. A sense amplifier 18 amplifies data read out from a selected one of the memory cells in the memory cell array 11. An output buffer 19 is controlled by an /OE (output enable) signal and outputs a signal amplified by the sense amplifier 18 via a data bus DB. An arithmetical circuit 20 subjects an output signal of the sense amplifier 18 to a preset operation and supplies the result of the operation to the output buffer 19. The arithmetical circuit 20 has a latch circuit provided therein, latches an output signal of the sense amplifier 18 in the latch circuit when a signal GETKEY is set at the "H" level, and subjects data latched in the latch circuit and an output signal of the sense amplifier 18 to the preset operation and supplies the result of the operation to the output buffer 19 when the above signal is set at the "L" level.

Figure 3:
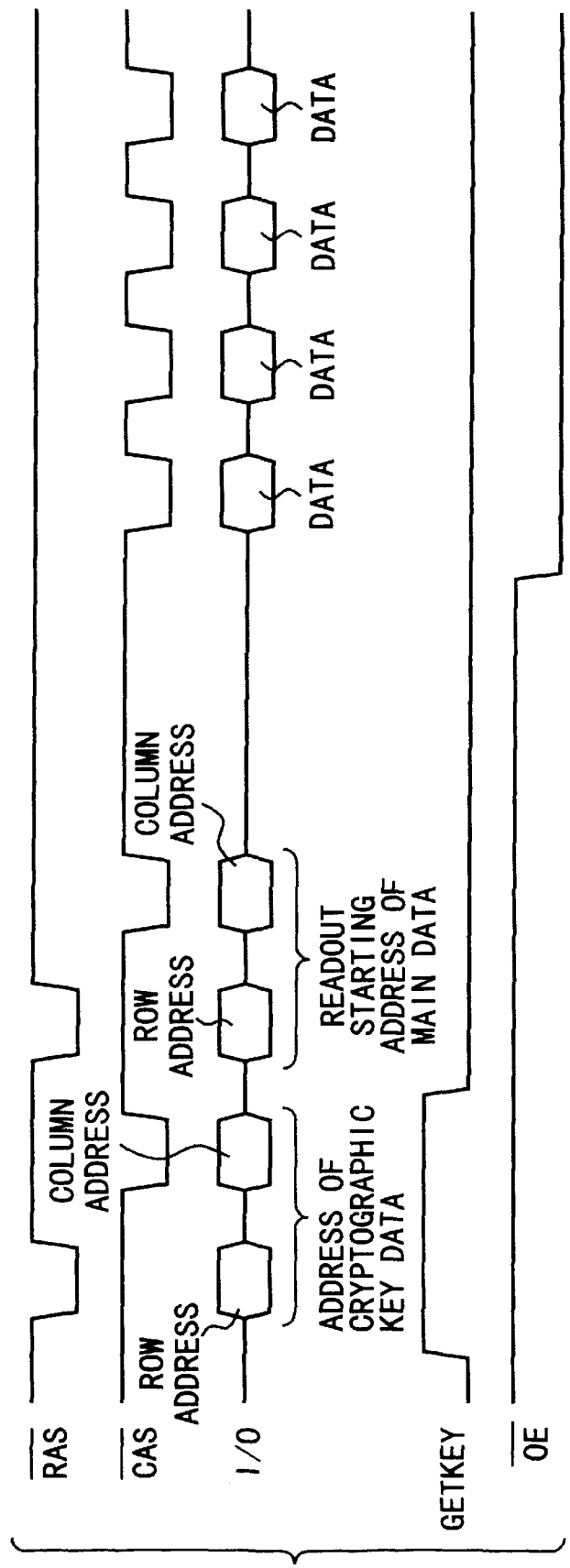
FIG. 3 is a timing chart for illustrating the data readout operation of the semiconductor memory device shown in FIG. 2.

Next, the data readout operation in the above construction is explained with reference to the timing chart of FIG. 3. First, the signal GETKEY supplied to the arithmetical circuit 20 is set to the "H" level. Then, a row address signal corresponding to a row address of the memory cell array 11 in which cryptographic key (encryption key) data is stored is latched into the row address buffer 12 in response to a fall of the /RAS signal. After this, a column address signal corresponding to a column address of the memory cell array 11 in which cryptographic key data is stored is latched into the column address buffer 13 in response to a rise of the /CAS signal. As a result, an address of the memory cell array 11 in which cryptographic key data is stored is selected and readout cryptographic key data is supplied to the latch circuit of the arithmetical circuit 20 via the column selection gate 16 and sense amplifier 18 and latched therein.

Next, the signal GETKEY is set to the "L" level and the row address and column address for starting the readout operation for main data are respectively latched in the row address buffer 12 and column address buffer 13 in response to the fall of the /RAS signal and /CAS signal in the same manner as in the above case. Then, one of the word lines is selected and driven by decoding the row address by use of the row decoder 14 and one of the bit lines is selected and charged by decoding the column address output from the column address counter 15 by use of the column decoder 17 and controlling the column selection gate 16. Thus, one of the memory cells in the memory cell array 11 is selected.

When the readout operation for main data is started, data stored in the selected memory cell is amplified by the sense amplifier 18 and then input to the arithmetical circuit 20. In the arithmetical circuit 20, input data and previously latched data (cryptographic key or decryption key) are subjected to the preset operation and the result of the operation is output from the output buffer 19 to the data bus DB in response to the /OE signal.

Then, a column address signal is created by sequentially incrementing the count value of the column address counter 15 in response to the fall of the /CAS signal and memory data items are sequentially read out from the memory cells connected to the word line selected by the row decoder 14. Also, at this time, the output signal of the sense amplifier 18 and data latched in the latch circuit are subjected to the preset operation in the same manner as described above and then the result of the operation is output from the output buffer 19 to the data bus DB in response to the /OE signal.

Next, a row address signal for specifying a next row for readout is fetched into the row address buffer 12 in response to the fall of the /RAS signal and the same operation as described above is repeatedly effected to read out data stored in the memory cell array 11.

By effecting the above readout operation, data stored in the memory cell array 11 is decoded (decrypted) by use of the cryptographic key (decryption key) and output to the exterior as normal data (plaintext).

FIG. 4 shows a circuit portion of one bit, for illustrating an example of the construction of the arithmetical circuit in the circuit shown in FIG. 2. The circuit of FIG. 4 includes P-channel MOS transistors Q1 to Q6, N-channel MOS transistors Q7 to Q12 and inverters INV1 to INV4. An output signal of the sense amplifier 18 is supplied to one end of a transfer gate TR1 constructed by the MOS transistors Q1 and Q7 and one end of a transfer gate TR2 constructed by the MOS transistors Q2 and Q8. The gates of the MOS transistors Q1 and Q8 are supplied with the signal GETKEY and the gates of the MOS transistors Q7 and Q2 are supplied with a signal obtained by inverting the signal GETKEY by the inverter INV1. The current paths of the MOS transistors Q3, Q4, Q9, Q10 are connected in series between a power source Vcc and a ground node Vss and the current paths of the MOS transistors Q5, Q6, Q11, Q12 are connected in series between the power source Vcc and the ground node Vss. The other end of the transfer gate TR1 is connected to the input terminal of the inverter INV2 and the gates of the MOS transistors Q6, Q11, and the output terminal of the inverter INV2 is connected to the gates of the MOS transistors Q4, Q9. Further, the other end of the transfer gate TR2 is connected to the gates of the MOS transistors Q10, Q5, the input terminal of the inverter INV3 and the output terminal of the inverter INV4. The output terminal of the inverter INV3 and the input terminal of the inverter INV4 are connected together to a common connection node and the common connection node is connected to the gates of the MOS transistors Q3, Q12. A connection node of the MOS transistors Q4, Q9 and a connection node of the MOS transistors Q6, Q11 are connected together and connected to the input terminal of the output buffer 19.

With the above construction, when the signal GETKEY is set at the "H" level, the transfer gate TR2 is set in the ON state and the transfer gate TR1 is set in the OFF state. As a result, the output signal of the sense amplifier 18 is supplied to a latch circuit LA constructed by the inverters INV3, INV4 via the transfer gate TR2 and latched therein. On the other hand, when the signal GETKEY is set at the "L" level, the transfer gate TR1 is set in the ON state and the transfer gate TR2 is set in the OFF state. As a result, the output signal of the sense amplifier 18 is supplied to the gates of the MOS transistors Q4, Q9 via the transfer gate TR1 and the inverter INV2 and to the gates of the MOS transistors Q6, Q11 via the transfer gate TR1. At this time, when data latched in the latch circuit LA is "1", that is, when an output of the inverter INV4 is set at the "H" level and an output of the inverter INV3 is set at the "L" level, the MOS transistors Q3, Q10 are set in the ON state and the MOS transistors Q5, Q12 are set in the OFF state so as to permit the output signal of the sense amplifier 18 to be supplied to the output buffer 19 via the transfer gate TR1, the inverter INV2 and an inverter constructed by the MOS transistors Q4, Q9. On the other hand, when data latched in the latch circuit LA is "0", that is, when an output of the inverter INV3 is set at the "H" level and an output of the inverter INV4 is set at the "L" level, the MOS transistors Q3, Q10 are set in the OFF state and the MOS transistors Q5, Q12 are set in the ON state so as to permit the output signal of the sense amplifier 18 to be supplied to the output buffer 19 via the transfer gate TR1 and an inverter constructed by the MOS transistors Q6, Q11.

Thus, the arithmetical circuit 20 performs the operation process for outputting input data as it is when latched data is "1" and inverting input data and then outputting the inverted data when the latched data is "0".

For example, as shown in FIG. 5A, when the cryptographic key data is "A8h" (h indicates a hexadecimal number) and if it is desired to program "29h", it is understood that "7Eh", which is data subjected to the inverse operation process by use of the cryptographic key data "A8h" may be written into the memory cell as shown in FIG. 5B. Likewise, in order to program "A9h" and "5Fh", "FEh" and "28h" may be respectively written into the memory cell.

In the conventional mask ROM, if it is desired to read out data from a specified address, data stored therein itself is output. However, in the mask ROM of this invention, since encoded data is stored in the memory cell array 11 and the encoded data is copied if the copying operation is simply effected, the copied data cannot be utilized. Further, if the cryptographic key data is erroneously input (when "82h" is input as the cryptographic key data in the case shown in FIG. 5A), the erroneous cryptographic key data and data read out from the memory cell array 11 are subjected to the preset operation and the result of the operation is output, and therefore, the copied data cannot be utilized.

Thus, in the semiconductor memory device of the first embodiment described above, unless an address of the memory cell array 11 in which the cryptographic key data is stored is first accessed and data is read out after the cryptographic key data is latched into the arithmetical circuit 20, correct data cannot be obtained. Therefore, even if stored data is copied by illegal means, the data cannot be utilized and memory data can be substantially protected from illegal copy.

In the first embodiment, a case wherein the cryptographic key data is written in a specified address of the memory cell array 11 is explained, but normal character-string data or numeral-string data (part of memory data) stored in the memory cell array 11 may be used as the cryptographic key data. In this case, since an area for storing the cryptographic key data becomes unnecessary, a reduction in the memory capacity can be prevented and since a person who attempts to make an illegal copy cannot predict the presence of cryptographic key data from the arrangement of stored data items, it becomes more difficult to specify the cryptographic key data and enhance the protect function.

FIG. 6 shows a memory space of a memory cell array 11, for illustrating a semiconductor memory device according to a second embodiment of this invention. The basic construction of the semiconductor memory device according to the second embodiment is the same as that of the circuit shown in FIG. 2, but in this embodiment, the memory space of the memory cell array 11 is divided into a plurality of areas and different cryptographic key data items are allocated to the plurality of areas. That is, "A8h" is programmed as cryptographic key data in an area 11a ranging from an address "0000h" to an address "3FFFh", "82h" is programmed as cryptographic key data in an area 11b ranging from an address "3FFFh" to an address "7FFFh", "7Eh" is programmed as cryptographic key data in an area 11c ranging from an address "7FFFh" to an address "AFFFh", and "F0h" is programmed as cryptographic key data in an area 11d ranging from an address "AFFFh" to an address "FFFFh", and encoded data items are written in the respective address areas 11a, 11b, 11c 11d so as to be decoded by use of the corresponding cryptographic key data.

With the above construction, when data is read out from the address area, it is necessary to input cryptographic key data corresponding to the address area and all of the cryptographic key data items must be analyzed in order to copy the entire memory space and the process for analyzing the cryptographic key data becomes more difficult.

Even in a case where the memory space is divided into a plurality of areas as in the second embodiment, it is also possible to use the normal character-string data or numeral-string data stored in the memory cell array as cryptographic key data as explained in the first embodiment.

Figure 7:
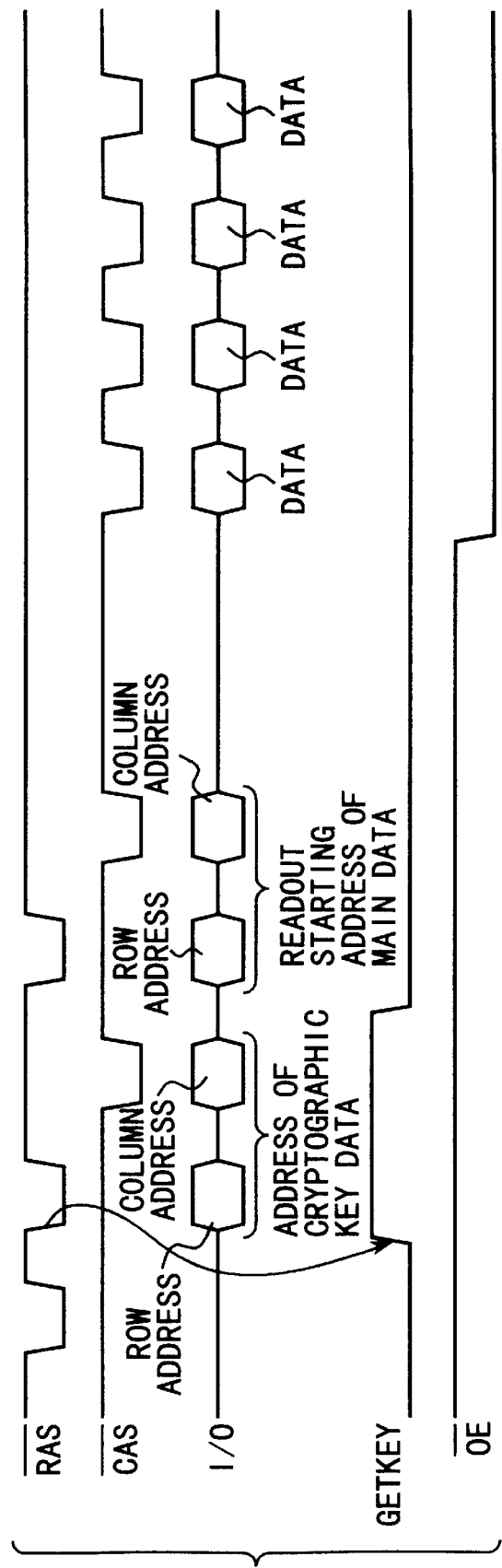
FIG. 7 is a timing chart for illustrating the data readout operation, for illustrating a semiconductor memory device according to a third embodiment of this invention.

FIG. 7 is a timing chart showing the operation of reading out memory data, for illustrating a semiconductor memory device according to a third embodiment of this invention. In the first and second embodiments, the signal GETKEY for controlling the operation of the arithmetical circuit 20 is supplied from the exterior, but in the third embodiment, the signal GETKEY is created by use of an internal signal of the chip. That is, in this example, when the /RAS signal is successively input twice (set to the "L" level twice), it is defined that the cryptographic key input is input.

Thus, if the operation of latching the cryptographic key data into the latch circuit provided in the arithmetical circuit 20 and the operation to which the cryptographic key data is subjected are controlled by use of a signal (in this example, /RAS signal) for controlling the data readout operation, a pin for inputting the signal GETKEY becomes unnecessary and the normal number of pins and the normal pin arrangement can be used, and as a result, the analyzing process becomes difficult for a person who attempts to make an illegal copy.

FIG. 8 shows an example of the construction of a circuit for creating the signal GETKEY for realizing the data readout operation shown in the timing chart of FIG. 7. The circuit includes D-type flip-flop circuits 21, 22 and a pulse signal creation circuit 23. The pulse signal creation circuit 23 is constructed by a delay circuit 24, NAND gate 25 and inverters 26-1, 26-2 and functions to reset the flip-flop circuits 21, 22 in response to the /CAS signal. The /RAS signal is supplied to the clock input terminal CLK of the flip-flop circuit 21 and the output terminal /Q of the flip-flop circuit 21 is connected to the data input terminal D thereof. Further, the output terminal Q of the flip-flop circuit 21 is connected to the clock input terminal CLK of the flip-flop circuit 22. The data input terminal D of the flip-flop circuit 22 is connected to the output terminal /Q of the flip-flop circuit 22 and the signal GETKEY is output from the data output terminal Q of the flip-flop circuit 22.

The /CAS signal is supplied to the input terminal of the delay circuit 24 and one of the input terminals of the NAND gate 25. The other input terminal of the NAND gate 25 is supplied with an output signal of the delay circuit 24 via the inverter 26-1 and an output signal of the NAND gate 25 is supplied to the reset input terminals R of the flip-flop circuits 21, 22 via the inverter 26-2.

FIG. 9 shows an example of the construction of the flip-flop circuits 21, 22 in the circuit shown in FIG. 8. Each of the flip-flop circuits includes inverters 27 to 32, transfer gates 33 to 36 and NOR gates 37, 38. The clock input terminal CLK is connected to the input terminal of the inverter 27 and the output terminal of the inverter 27 is connected to the input terminal of the inverter 28, the gates of P-channel MOS transistors constructing the transfer gates 33, 36, and the gates of N-channel MOS transistors constructing the transfer gates 34, 35. Further, the output terminal of the inverter 28 is connected to the gates of N-channel MOS transistors constructing the transfer gates 33, 36 and the gates of P-channel MOS transistors constructing the transfer gates 34, 35. The transfer gates 33 to 36 are serially connected and the data input terminal D is connected to one end of the transfer gate 33. One end of the transfer gate 36 is connected to the input terminal of the inverter 29 and the output terminal of the inverter 29 is connected to the output terminal /Q and the input terminal of the inverter 30. The output terminal of the inverter 30 is connected to the output terminal Q.

The input terminal of the inverter 31 is connected to a connection node of the transfer gates 33 and 34 and the output terminal thereof is connected to one of the input terminals of the NOR gate 37. The other input terminal of the NOR gate 37 is connected to the reset input terminal R and the output terminal thereof is connected to a connection node of the transfer gates 34 and 35. The input terminal of the inverter 32 is connected to a connection node of the transfer gates 35 and 36 and the output terminal thereof is connected to one of the input terminals of the NOR gate 38. The other input terminal of the NOR gate 38 is connected to the reset input terminal R and the output terminal thereof is connected to the input terminal of the inverter 29.

Figure 10:
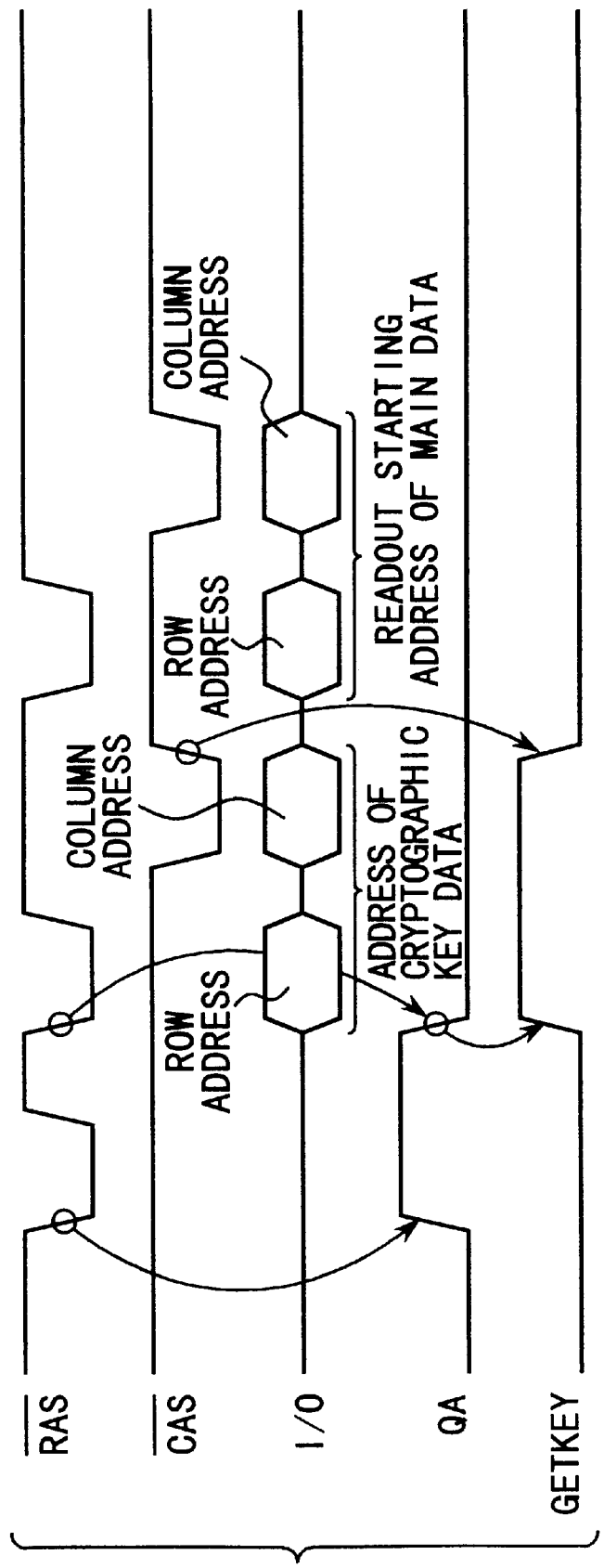
FIG. 10 is a timing chart for illustrating the operation of the circuit shown in FIGS. 8 and 9.

With the above construction, as shown by the timing chart shown in FIG. 10, when the /RAS signal falls to the "L" level, the flip-flop circuit 21 is set, and the output signal QA of the flip-flop circuit 21 is set to the "H" level and supplied to the clock input terminal CLK of the flip-flop circuit 22. After a preset period of time has elapsed, the /RAS signal rises to the "H" level, and when the /RAS signal falls to the "L" level again, the output signal QA of the flip-flop circuit 21 is set to the "L" level and the flip-flop circuit 22 is set to set the signal GETKEY to the "H" level.

As a result, since it becomes possible to latch the cryptographic key data into the latch circuit of the arithmetical circuit 20, a row address signal and column address signal corresponding to an address of the memory cell array 11 in which the cryptographic key data is stored are input to latch the cryptographic key data.

After this, when the /CAS signal falls to the "L" level, a pulse signal is output from the pulse signal creation circuit 23 and the flip-flop circuits 21, 22 are reset to set the signal GETKEY to the "L" level. In this state, preparation for readout of main data is made and access to the memory cell array 11 is made to read out data.

According to the above construction, since an external pad for inputting the signal GETKEY becomes unnecessary, the same number of pads and the same pad arrangement as in the conventional semiconductor memory device can be used, the analyzing process becomes difficult for a person who attempts to make an illegal copy.

FIG. 11 is a block diagram showing a semiconductor memory device according to a fourth embodiment of this invention. The circuit is constructed by using an arithmetical circuit 20' instead of the arithmetical circuit 20 provided in the circuit of FIG. 2 and additionally using a counter 39. The arithmetical circuit 20' does not include a latch circuit and the equivalent operation of the latch circuit is effected by the counter 39. That is, in the counter 39, cryptographic key data is previously set prior to the main data readout operation by the same operation as described in the former embodiments, the count value of the counter 39 and an output of the sense amplifier 18 are subjected to an operation in the arithmetical circuit 20', and the result of the operation is output from the output buffer 19 to the data bus DB. The content of the counter 39 is sequentially incremented or decremented by a control signal (/CAS signal in FIG. 11) for readout.

In the memory cell array 11, cryptographic key data (which may be constructed by use of part of main data) and encoded data subjected to an operation by use of data obtained by sequentially incrementing or decrementing the cryptographic key data are stored and the data is decoded by subjecting the same to an operation in the arithmetical circuit 20'.

With the above construction, since the count value of the counter 39 is sequentially incremented or decremented in response to the /CAS signal and the cryptographic key data is changed in response to the /CAS signal, the analyzing process for specifying the cryptographic key data becomes more difficult.

Figure 12:
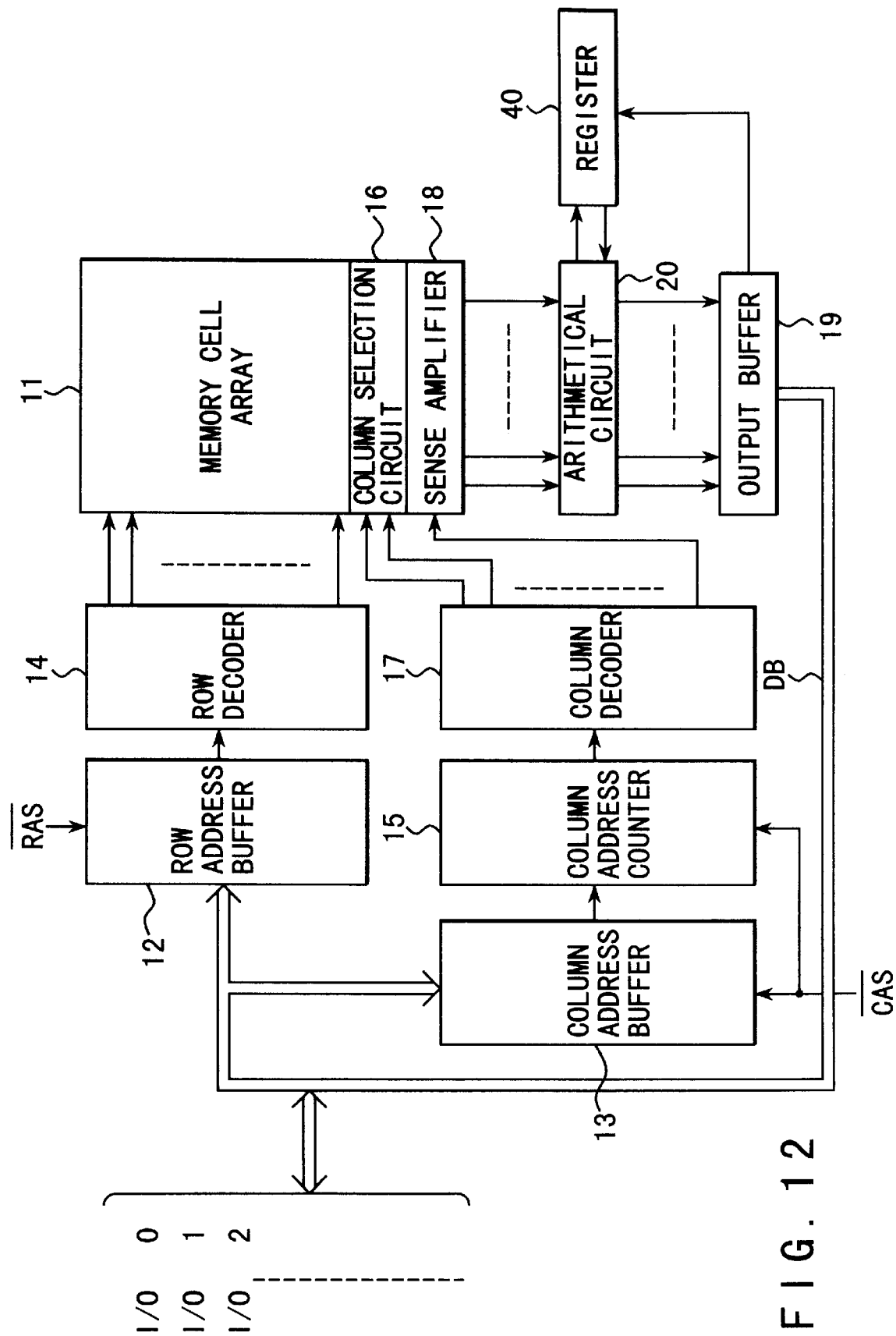
FIG. 12 is a block diagram showing the schematic construction of a semiconductor memory device according to a fifth embodiment of this invention.

FIG. 12 is a block diagram showing a semiconductor memory device according to a fifth embodiment of this invention. The circuit is constructed by using an arithmetical circuit 20' instead of the arithmetical circuit 20 provided in the circuit of FIG. 2 and additionally using a register 40. The arithmetical circuit 20' does not include a latch circuit and the equivalent operation of the latch circuit is effected by the register 40. In the register 40, cryptographic key data is temporarily stored prior to the main data readout operation by the same operation as described in the former embodiments, the temporarily stored value of the register 40 and an output of the sense amplifier 18 are subjected to an operation in the arithmetical circuit 20', and the result of the operation is output from the output buffer 19 to the data bus DB and temporarily stored in the register 40 again.

In the memory cell array 11, cryptographic key data (which may be constructed by use of part of main data) and encoded data subjected to an operation by use of the cryptographic key data and data to be stored are stored and the data is decoded by the arithmetical circuit 20'.

With the above construction, since the cryptographic key data temporarily stored in the register 40 is updated and changed each time the data readout operation is effected, the analyzing process for specifying the cryptographic key data becomes more difficult.

FIG. 13 shows a semiconductor memory device according to a sixth embodiment of this invention in which this invention is applied to a randomly accessible ROM. In FIG. 13, portions corresponding to those of FIG. 2 are denoted by the same reference numerals. In the random access ROM, since a column address signal is input from the exterior via an address bus AB, the column address counter 15 becomes unnecessary.

Figure 14:
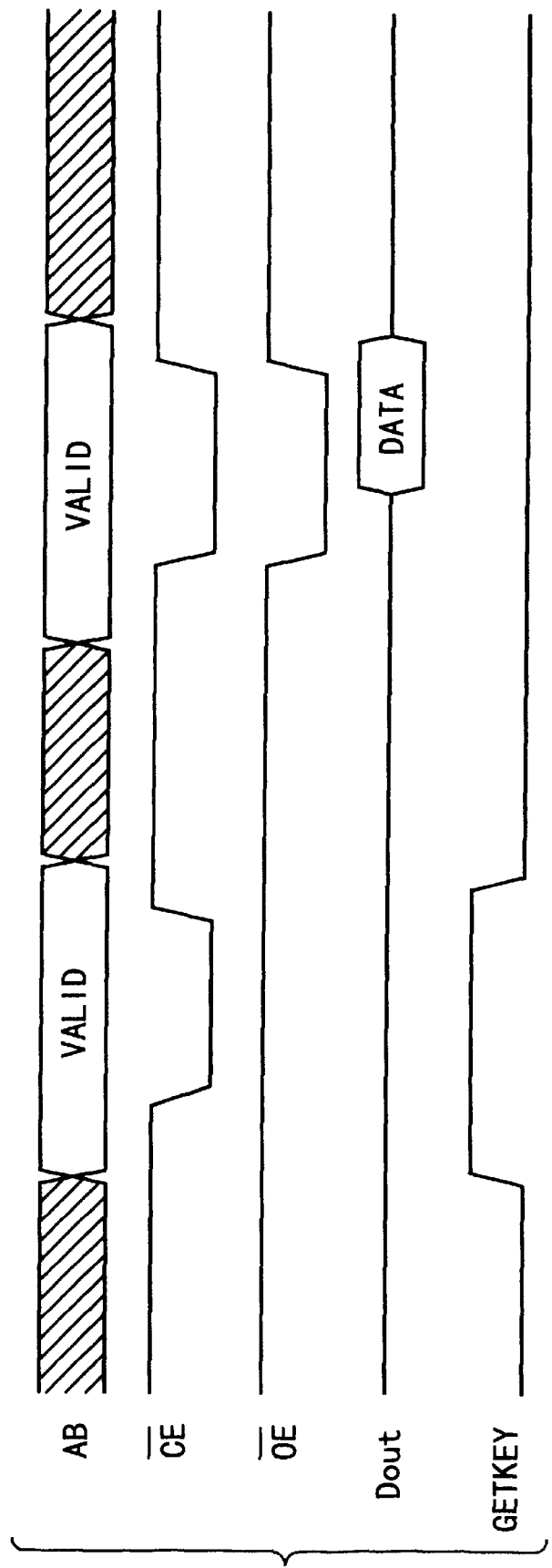
FIG. 14 is a timing chart for illustrating the operation of the circuit shown in FIG. 13.

As shown by the timing chart of FIG. 14, the signal GETKEY is first set to the "H" level, the /CE signal is set to the "L" level, an address in which the cryptographic key data is stored is accessed, and the cryptographic key data is latched in the latch circuit provided in the arithmetical circuit 20. After this, the readout operation of the main data memory cell is started, and a row address and column address are input in response to the fall of the /CE signal to read out data from the selected memory cell in the memory cell array 11 and supply the readout data to the sense amplifier 18. Then, an output signal of the sense amplifier 18 and the latched cryptographic key data are subjected to an operation in the arithmetical circuit and data Dout is output from the output buffer 19 in response to the fall of the /OE signal.

With the above construction, unless an address of data treated as the cryptographic key data is first accessed and the readout operation is effected with the data latched in the latch circuit, the result of an operation performed based on erroneous data is output and correct data cannot be read out. Further, since data subjected to the operation by use of the cryptographic key data is stored in the memory cell array 11, memory data in the memory cell array is encoded data which is not yet subjected to the operation process for decoding and cannot be utilized if it is simply copied.

Therefore, even in the random access ROM, a high-level protect function can be attained as in the case of the serial access ROM explained in the first to fifth embodiments.

FIG. 15 is a block diagram showing a semiconductor memory device according to a seventh embodiment of this invention. The circuit is a randomly accessible ROM and is obtained by adding a counter 39 and an ATD pulse generator 41 to the circuit of FIG. 13. In the counter 39, cryptographic key data stored in the memory cell array 11 is set before the normal data readout operation. The ATD pulse generator 41 detects address transition, outputs a pulse signal, and sequentially increments or decrements the count value set in the counter 39 in response to an output of the column address buffer 13.

With the above construction, since the cryptographic key data set in the counter 39 is increased or decreased each time the address transition is detected by the ATD pulse generator 41, the analyzing process for specifying the cryptographic key data becomes more difficult. Further, since a pin for inputting a control signal is unnecessary and the normal number of pins and the normal pin arrangement can be used, the analyzing process can be made difficult also in this respect.

Figure 16:
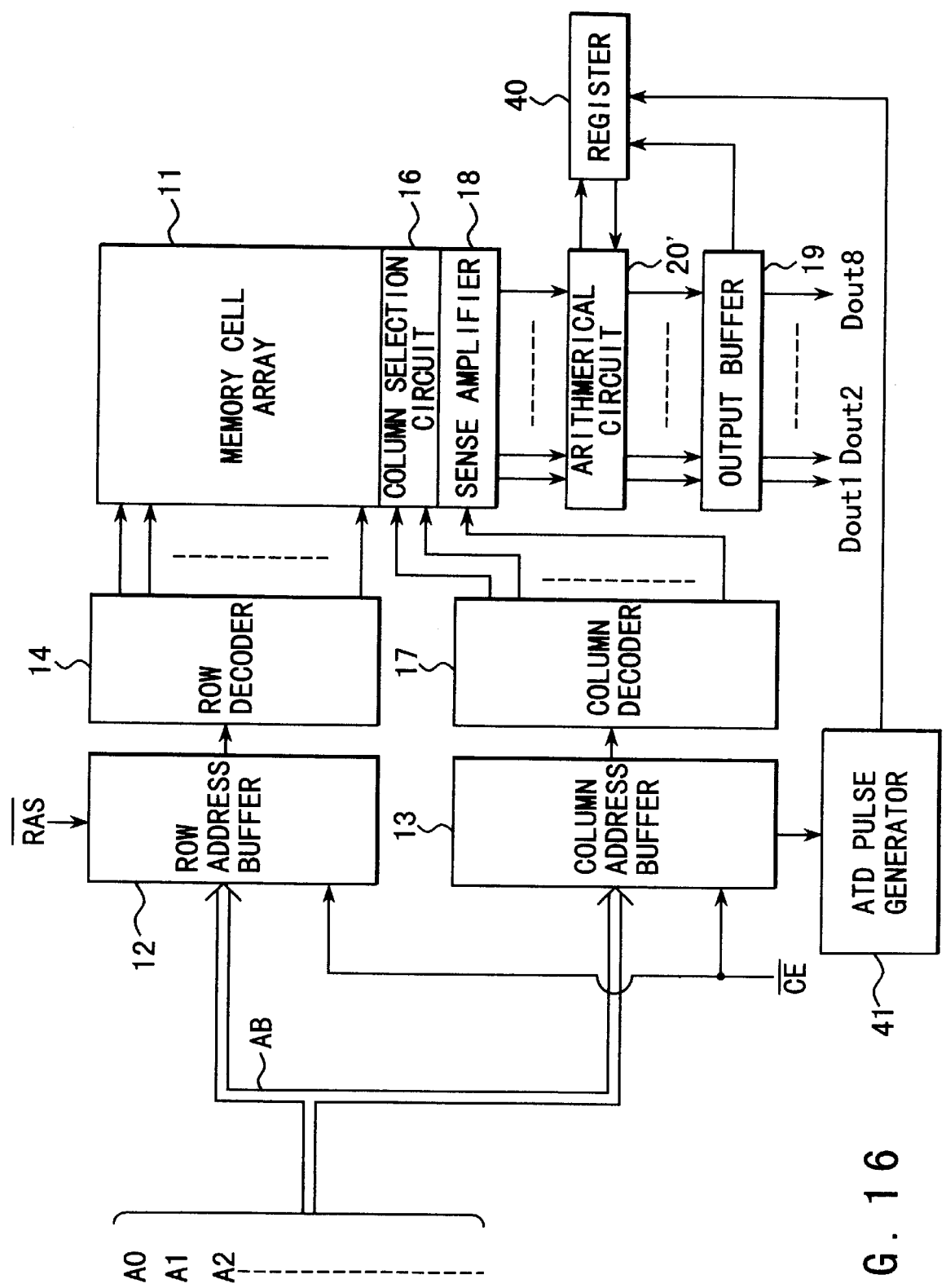
FIG. 16 is a block diagram showing the schematic construction of a semiconductor memory device according to an eighth embodiment of this invention.

FIG. 16 is a block diagram showing a semiconductor memory device according to an eighth embodiment of this invention. The circuit is a randomly accessible ROM and is obtained by adding a register 40 and an ATD pulse generator 41 to the circuit of FIG. 13. In the register 40, cryptographic key data is temporarily stored before the data readout operation by the same operation as described in the former embodiments, the temporarily stored value of the register 40 and an output signal of the sense amplifier 18 are subjected to an operation in the arithmetical circuit 20', the result of the operation is output from the output buffer 19, and the output signal of the output buffer 19 is temporarily stored in the register 40 again when the address transition is detected by the ATD pulse generator 41.

With the above construction, since the cryptographic key data temporarily stored in the register 40 is updated and changed each time the address transition is detected, the analyzing process for specifying the cryptographic key data becomes difficult. Further, since a pin for inputting a control signal is unnecessary and the normal number of pins and the normal pin arrangement can be used, the analyzing process can be made difficult also in this respect.

This invention is not limited to the above embodiments and can be variously modified without departing from the technical scope thereof. For example, the construction in which the memory space is divided into a plurality of areas and different cryptographic key data items are allocated to the respective areas as explained in the second embodiment can be applied to the construction of the third to eighth embodiments. Further, in each of the above embodiments, the mask ROM is explained as an example, but this invention can also be applied to another type ROM, SRAM, DRAM.

As explained above, according to this invention, it is possible to provide a semiconductor memory device and an access method therefor capable of substantially protecting memory data from illegal copy by making copied data unusable even if stored data is copied by illegal means.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A semiconductor memory device comprising:
 a memory cell array having memory cells arranged in a matrix form of rows and columns;
 row selection means for selecting a row of the memory cells in said memory cell array;
 column specifying means for specifying a column of the memory cells in said memory cell array;
 sense amplifier means for determining memory data of one of the memory cells selected by said row selection means and said column specifying means;
 holding means for holding data output from said sense amplifier means; and
 arithmetical means for subjecting data held in said holding means and data output from said sense amplifier means to an operation;
 wherein data read out from the memory cell selected by said row selection means and said column specifying means is held in said holding means as cryptographic key data, then data held in said holding means and data output from said sense amplifier means are subjected to an operation in said arithmetical means and the result of the operation is output as readout data.

2. A semiconductor memory device according to claim 1, wherein data encoded by data held in said holding means so as to be decoded by the operation by said arithmetical means is stored in the memory cell.

3. A semiconductor memory device according to claim 1, wherein the memory space of said memory cell array is divided into a plurality of areas, different cryptographic key data items are stored in the respective areas, and data items encoded by use of corresponding cryptographic key data items so as to be decoded by the operation of said arithmetical means are stored in the respective areas.

4. A semiconductor memory device according to claim 1, wherein the operation of inputting data to said holding means is effected in response to a control signal supplied from the exterior.

5. A semiconductor memory device according to claim 1, which further comprises signal creation means for creating a control signal when a signal for controlling data readout from the memory cell is successively input by plural times and in which the operation of inputting data to said holding means is effected in response to a control signal created by said signal creation means.

6. A semiconductor memory device according to claim 1, wherein data held in said holding means changes in response to a signal supplied from the exterior and data which is encoded by use of changing data held in said holding means so as to be decoded by the operation of said arithmetical means is stored in the memory cell.

7. A semiconductor memory device according to claim 1, wherein data held in said holding means is changed by subjecting the same together with data read out in the immediately preceding cycle to a preset operation and data encoded by use of the changing data held in said holding means so as to be decoded by the operation by said arithmetical means is stored in the memory cell.

8. A semiconductor memory device according to claim 1, wherein data held in said holding means is changed in response to the address transition and data encoded by use of the changing data held in said holding means so as to be decoded by the operation by said arithmetical means is stored in the memory cell.

9. A semiconductor memory device according to claim 1, wherein at least part of data stored in said memory cell array is used as the cryptographic key data.

10. A semiconductor memory device comprising:
a memory cell array which has memory cells arranged in a matrix form of rows and columns and in which cryptographic key data and data subjected to an operation by use of the cryptographic key data are stored;
word lines each connected to the gates of the memory cells arranged on a corresponding one of the rows in said memory cell array;
bit lines each connected to the drains of the memory cells arranged on a corresponding one of the columns in said memory cell array;
word line selecting means for selecting the word line;
bit line selecting means for selecting the bit line;
sense amplifier means for amplifying data read out from the memory cell selected by said word line selecting means and said bit line selecting means;
latch means for latching data output from said sense amplifier means in response to a control signal;
arithmetical means for subjecting data latched in the latch circuit and data output from said sense amplifier means to an operation in response to the control signal; and
output means for outputting the result of the operation performed by said arithmetical means;
wherein an address of the memory cell of said memory cell array in which the cryptographic key data is stored is selected by said word line selecting means and means bit line selecting circuit, cryptographic key data output from said sense amplifier means is latched in said latch means, then an address of one of the memory cells in said memory cell array is selected by said word line selecting means and said bit line selecting means, data output from said sense amplifier means and cryptographic key data latched in said latch means are subjected to an operation by said arithmetical means, and the result of the operation is output as readout data from said output means.

11. A semiconductor memory device according to claim 10, wherein the memory space of said memory cell array is divided into a plurality of areas, different cryptographic key data items are allocated to and stored in the respective areas, and data items subjected to an operation by use of cryptographic key data items corresponding to the respective areas are stored in the respective areas.

12. A semiconductor memory device according to claim 10, wherein at least part of data stored in said memory cell array is used as the cryptographic key data.

13. A semiconductor memory device comprising:
a memory cell array which has memory cells arranged in a matrix form of rows and columns and in which cryptographic key data and data subjected to an operation by use of data obtained by sequentially incrementing or decrementing the cryptographic key data are stored;
word lines each connected to the gates of the memory cells arranged on a corresponding one of the rows in said memory cell array;
bit lines each connected to the drains of the memory cells arranged on a corresponding one of the columns in said memory cell array;
word line selecting means for selecting the word line;
bit line selecting means for selecting the bit line;
sense amplifier means for amplifying data read out from the memory cell selected by said word line selecting means and said bit line selecting means;
counter means in which data output from said sense amplifier means is set in response to a control signal and which is sequentially incremented or decremented in response to the control signal;
arithmetical means for subjecting a count value of said counter means and data output from said sense amplifier means to an operation in response to the control signal; and
output means for outputting the result of the operation by said arithmetical means;
wherein an address of the memory cell of said memory cell array in which the cryptographic key data is stored is selected by said word line selecting means and said bit line selecting means, cryptographic key data output from said sense amplifier means is set in said counter means, then an address of one of the memory cells in said memory cell array is selected by said word line selecting means and said bit line selecting means, data output from said sense amplifier means and the count value of said counter means are subjected to an operation by said arithmetical means, and the result of the operation is output as readout data from said output means.

14. A semiconductor memory device according to claim 13, wherein the memory space of said memory cell array is divided into a plurality of areas, different cryptographic key data items are allocated to and stored in the respective areas, and data items subjected to an operation by use of cryptographic key data items corresponding to the respective areas are stored in the respective areas.

15. A semiconductor memory device according to claim 13, wherein at least part of data stored in said memory cell array is used as the cryptographic key data.

16. A semiconductor memory device comprising:
a memory cell array which has memory cells arranged in a matrix form of rows and columns and in which cryptographic key data and data subjected to an operation by use of the cryptographic key data and data to be stored are stored;
word lines each connected to the gates of the memory cells arranged on a corresponding one of the rows in said memory cell array;
bit lines each connected to the drains of the memory cells arranged on a corresponding one of the columns in said memory cell array;
word line selecting means for selecting the word line;
bit line selecting means for selecting the bit line;
sense amplifier means for amplifying data read out from the memory cell selected by said word line selecting means and said bit line selecting means;
arithmetical means supplied with an output signal from said sense amplifier means;
output means for outputting the result of the operation performed by said arithmetical means; and
register means for temporarily storing output data of said output means and supplying the same to said arithmetical means;

wherein an address of the memory cell of said memory cell array in which the cryptographic key data is stored is selected by said word line selecting means and said bit line selecting means, cryptographic key data output from said sense amplifier means is temporarily stored in said register means, then an address of one of the memory cells in said memory cell array is selected by said word line selecting means and said bit line selecting means, data output from said sense amplifier means and data temporarily stored in said register means are subjected to an operation by said arithmetical means, and the result of the operation is output as readout data from said output means and temporarily stored in said register means.

17. A semiconductor memory device according to claim 16, wherein the memory space of said memory cell array is divided into a plurality of areas, different cryptographic key data items are allocated to and stored in the respective areas, and data items subjected to an operation by use of cryptographic key data items corresponding to the respective areas are stored in the respective areas.

18. A semiconductor memory device according to claim 16, wherein at least part of data stored in said memory cell array is used as the cryptographic key data.

19. A semiconductor memory device comprising:
a memory cell array which has memory cells arranged in a matrix form of rows and columns and in which cryptographic key data and data subjected to an operation by use of data obtained by sequentially incrementing or decrementing the cryptographic key data are stored;
word lines each connected to the gates of the memory cells arranged on a corresponding one of the rows in said memory cell array;
bit lines each connected to the drains of the memory cells arranged on a corresponding one of the columns in said memory cell array;
word line selecting means for selecting the word line;
bit line selecting means for selecting the bit line;
sense amplifier means for amplifying data read out from the memory cell selected by said word line selecting means and said bit line selecting means;
arithmetical means supplied with an output signal of said sense amplifier means;
output means for outputting the result of the operation performed by said arithmetical means;
address transition detecting means for detecting the transition of the address; and
counter means which is sequentially incremented or decremented each time the address transition is detected by said address transition detecting means and supplies the count to said arithmetical means;
wherein an address of the memory cell of said memory cell array in which the cryptographic key data is stored is selected by said word line selecting means and said bit line selecting means, cryptographic key data output from said sense amplifier means is set in said counter means, then an address of one of the memory cells in said memory cell array is selected by said word line selecting means and said bit line selecting means, data output from said sense amplifier means and the count value of said counter means are subjected to an operation by said arithmetical means, and the result of the operation is output as readout data from said output means.

20. A semiconductor memory device according to claim 19, wherein the memory space of said memory cell array is divided into a plurality of areas, different cryptographic key data items are allocated to and stored in the respective areas, and data items subjected to an operation by use of cryptographic key data items corresponding to the respective areas are stored in the respective areas.

21. A semiconductor memory device according to claim 19, wherein at least part of data stored in said memory cell array is used as the cryptographic key data.

22. A semiconductor memory device comprising:
a memory cell array which has memory cells arranged in a matrix form of rows and columns and in which cryptographic key data and data subjected to an operation by use of the cryptographic key data are stored;
word lines each connected to the gates of the memory cells arranged on a corresponding one of the rows in said memory cell array;
bit lines each connected to the drains of the memory cells arranged on a corresponding one of the columns in said memory cell array;
word line selecting means for selecting the word line;
bit line selecting means for selecting the bit line;
sense amplifier means for amplifying data read out from the memory cell selected by said word line selecting means and said bit line selecting means;
arithmetical means supplied with an output signal from said sense amplifier means;
output means for outputting the result of the operation performed by said arithmetical means;
address transition detecting means for detecting the transition of the address; and
register means for temporarily storing output data of said output means when the address transition is detected by said address transition detecting means;
wherein an address of the memory cell of said memory cell array in which the cryptographic key data is stored is selected by said word line selecting means and said bit line selecting means, cryptographic key data output from said sense amplifier means is temporarily stored in said register means, then an address of one of the memory cells in said memory cell array is selected by said word line selecting means and said bit line selecting means, data output from said sense amplifier means and data temporarily stored in said register means are subjected to an operation by said arithmetical means, and the result of the operation is output as readout data from said output means and supplied to and temporarily stored in said register means.

23. A semiconductor memory device according to claim 22, wherein the memory space of said memory cell array is divided into a plurality of areas, different cryptographic key data items are allocated to and stored in the respective areas, and data items subjected to an operation by use of cryptographic key data items corresponding to the respective areas are stored in the respective areas.

24. A semiconductor memory device according to claim 22, wherein at least part of data stored in said memory cell array is used as the cryptographic key data.

25. A method for accessing a semiconductor memory device comprising:
a first step of storing cryptographic key data and data subjected to an operation by use of the cryptographic key data into a memory cell array;
a second step of accessing an address of the memory cell array in which the cryptographic key data is stored;

a third step of holding readout cryptographic key data;

a fourth step of accessing the memory cell array to read out data;

a fifth step of subjecting cryptographic key data held in said third step and data read out in said fourth step to an operation; and a sixth step of outputting the result of the operation obtained in said fifth step as readout data of the memory cell.

26. A method for accessing a semiconductor memory device according to claim 25, wherein data held in said third step is changed in response to a control signal supplied from the exterior.

27. A method for accessing a semiconductor memory device according to claim 25, wherein data held in said third step is changed in response to the address transition.

28. A method for accessing a semiconductor memory device according to claim 25, further comprising a seventh step of replacing data output in said sixth step by data held in said third step.

29. A method for accessing a semiconductor memory device comprising:

a first step of storing encoded data into a memory cell array;

a second step of accessing an address of data stored in the memory cell array as cryptographic key data;

a third step of holding readout data;

a fourth step of accessing the memory cell array to read out data;

a fifth step of subjecting data held in said third step and data read out in said fourth step to an operation; and a sixth step of outputting the result of the operation obtained in said fifth step as readout data from the memory cell.

30. A method for accessing a semiconductor memory device according to claim 29, wherein data held in said third step is changed in response to a control signal supplied from the exterior.

31. A method for accessing a semiconductor memory device according to claim 29, wherein data held in said third step is changed in response to the address transition.

32. A method for accessing a semiconductor memory device according to claim 29, further comprising a seventh step of replacing data output in said sixth step by data held in said third step.

* * * * *